(12) United States Patent  (10) Patent No.: US 7,305,890 B2
Zias et al. (45) Date of Patent: Dec. 11, 2007

(54) MICRO-ELECTROMECHANICAL SENSOR

(75) Inventors: Art Zias, Los Altos, CA (US); Phil Mauger, Santa Clara, CA (US); Sean Cahill, Palo Alto, CA (US); Norm Nystrom, Saratoga, CA (US); Albert K. Henning, Palo Alto, CA (US)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/329,765

(22) Filed: Jan. 10, 2006

(65) Prior Publication Data

US 2006/0117857 A1 Jun. 8, 2006

Related U.S. Application Data

(62) Division of application No. 10/198,304, filed on Jul. 17, 2002, now Pat. No. 7,047,814.

(60) Provisional application No. 60/306,175, filed on Jul. 17, 2001.

(51) Int. Cl.
*G01B 7/16* (2006.01)
*G01L 1/00* (2006.01)
(52) U.S. Cl. ...................................................... 73/780
(58) Field of Classification Search ................... 73/780
See application file for complete search history.

(56) References Cited

U.S. PATENT DOCUMENTS

| | | | |
|---|---|---|---|
| 4,178,621 A | 12/1979 | Simonelic et al. | |
| 4,345,299 A | 8/1982 | Ho | |
| 4,358,814 A | 11/1982 | Lee et al. | |
| 4,578,735 A * | 3/1986 | Knecht et al. | 361/283.4 |
| 4,599,888 A | 7/1986 | Hufton et al. | |
| 4,701,826 A * | 10/1987 | Mikkor | 361/283.4 |
| 4,948,174 A | 8/1990 | Thomson et al. | |
| 4,996,627 A | 2/1991 | Zias et al. | |
| 5,121,945 A | 6/1992 | Thomson et al. | |
| 5,274,567 A | 12/1993 | Kallin et al. | |
| 5,357,806 A | 10/1994 | Dennis et al. | |
| 5,369,544 A | 11/1994 | Mastrangelo | |
| 5,528,452 A | 6/1996 | Ko | |
| 5,531,128 A | 7/1996 | Ryhänen | |
| 5,585,311 A | 12/1996 | Ko | |
| 5,756,899 A * | 5/1998 | Ugai et al. | 73/714 |
| 5,757,608 A | 5/1998 | Bernot et al. | |
| 5,936,164 A | 8/1999 | Sparks et al. | |
| 6,006,607 A | 12/1999 | Bryzek et al. | |
| 6,109,113 A * | 8/2000 | Chavan et al. | 73/718 |
| 6,122,973 A | 9/2000 | Nomura et al. | |
| 6,151,967 A | 11/2000 | McIntosh et al. | |
| 6,211,558 B1 | 4/2001 | Ismail et al. | |

(Continued)

*Primary Examiner*—Michael Cygan
*Assistant Examiner*—Octavia Davis
(74) *Attorney, Agent, or Firm*—Morgan Lewis & Bockius LLP

(57) ABSTRACT

A force or pressure transducer is includes a substrate, a dielectric material disposed on the substrate, a spacing member disposed on the dielectric material, and a resilient element disposed on both the dielectric material and the spacing member. A portion of the resilient element is separated from the dielectric material, and another portion of the resilient element is in contact with the dielectric material. The contact area between the resilient element and the dielectric material varies in response to movement of the resilient element. Changes in the contact area alter the capacitance of the transducer, which can be measured through associated circuitry.

22 Claims, 14 Drawing Sheets

U.S. PATENT DOCUMENTS

| | | |
|---|---|---|
| 6,252,759 B1 | 6/2001 | Lange et al. |
| 6,257,068 B1 | 7/2001 | Briefer et al. |
| 6,267,009 B1 | 7/2001 | Drewes et al. |
| 6,355,534 B1 | 3/2002 | Cheng et al. |
| 6,465,271 B1 | 10/2002 | Ko et al. |
| 6,496,348 B2 | 12/2002 | McIntosh |
| 6,556,417 B2 | 4/2003 | McIntosh et al. |
| 6,633,172 B1 * | 10/2003 | Doemens et al. ............ 324/661 |
| 6,860,154 B2 * | 3/2005 | Yamamoto et al. ............ 73/718 |
| 7,047,814 B2 * | 5/2006 | Zias et al. ..................... 73/718 |
| 2001/0008478 A1 | 7/2001 | McIntosh et al. |
| 2003/0019299 A1 | 1/2003 | Horie et al. |

* cited by examiner

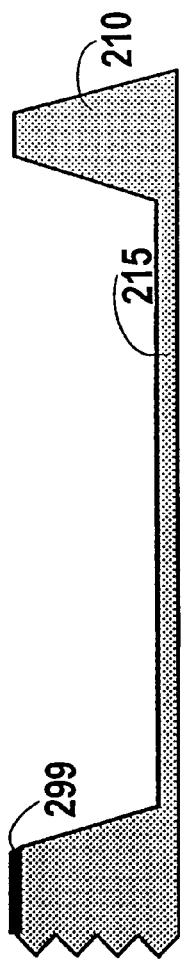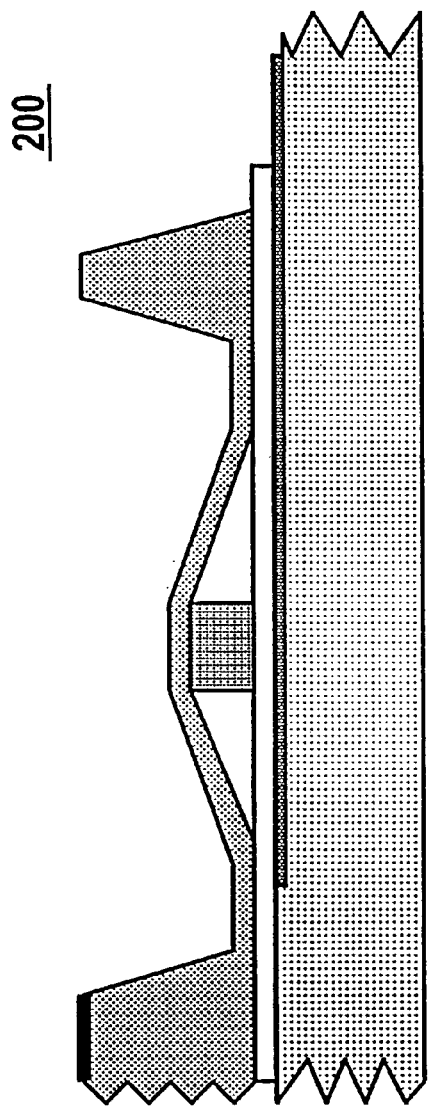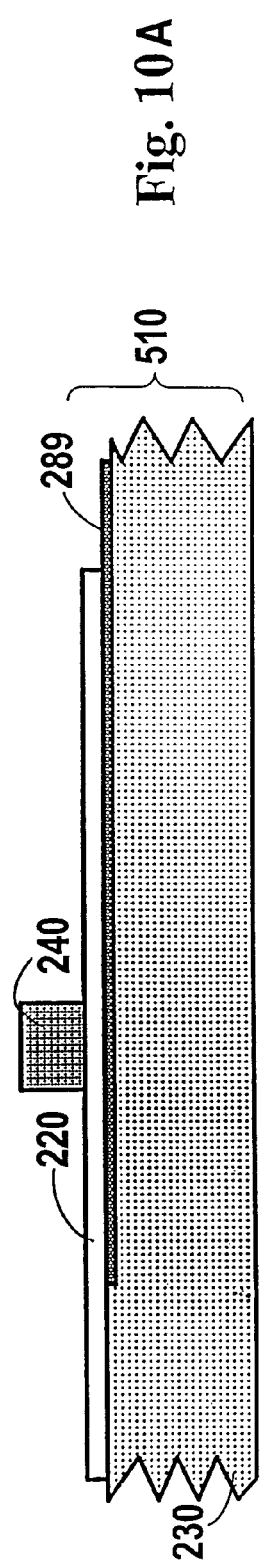
Fig. 10B
Fig. 10C
Fig. 10A

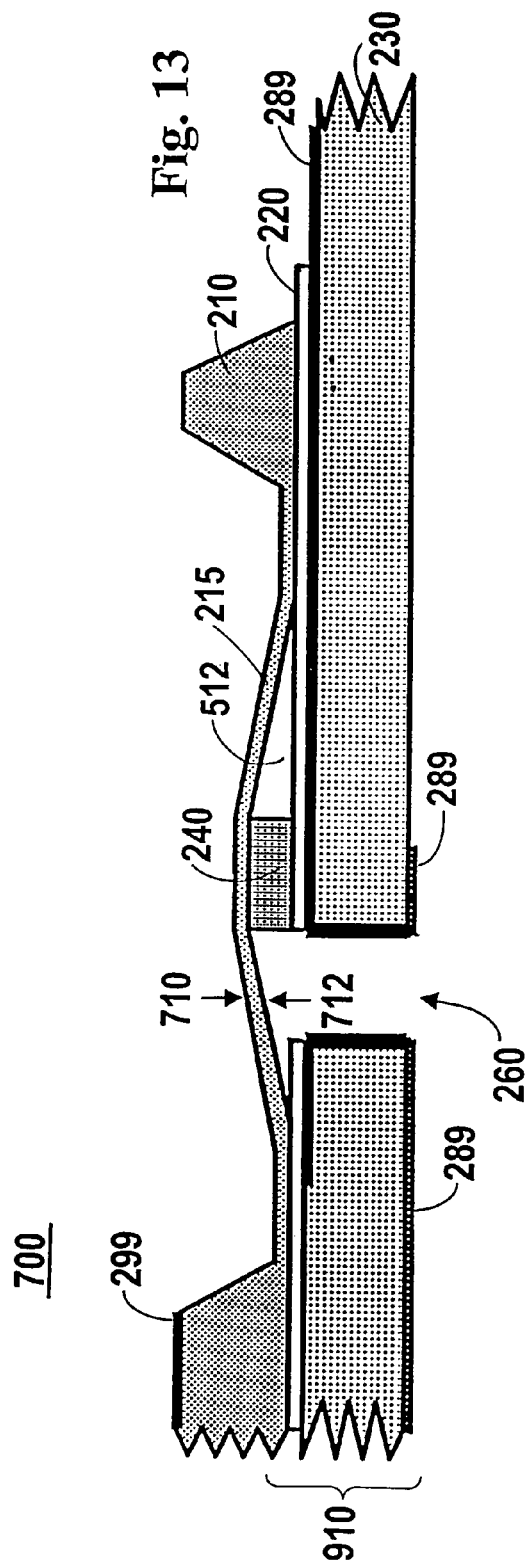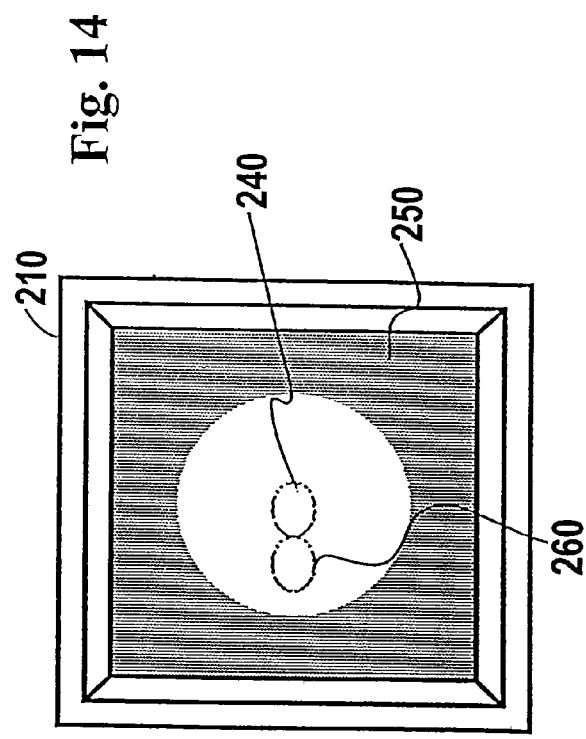

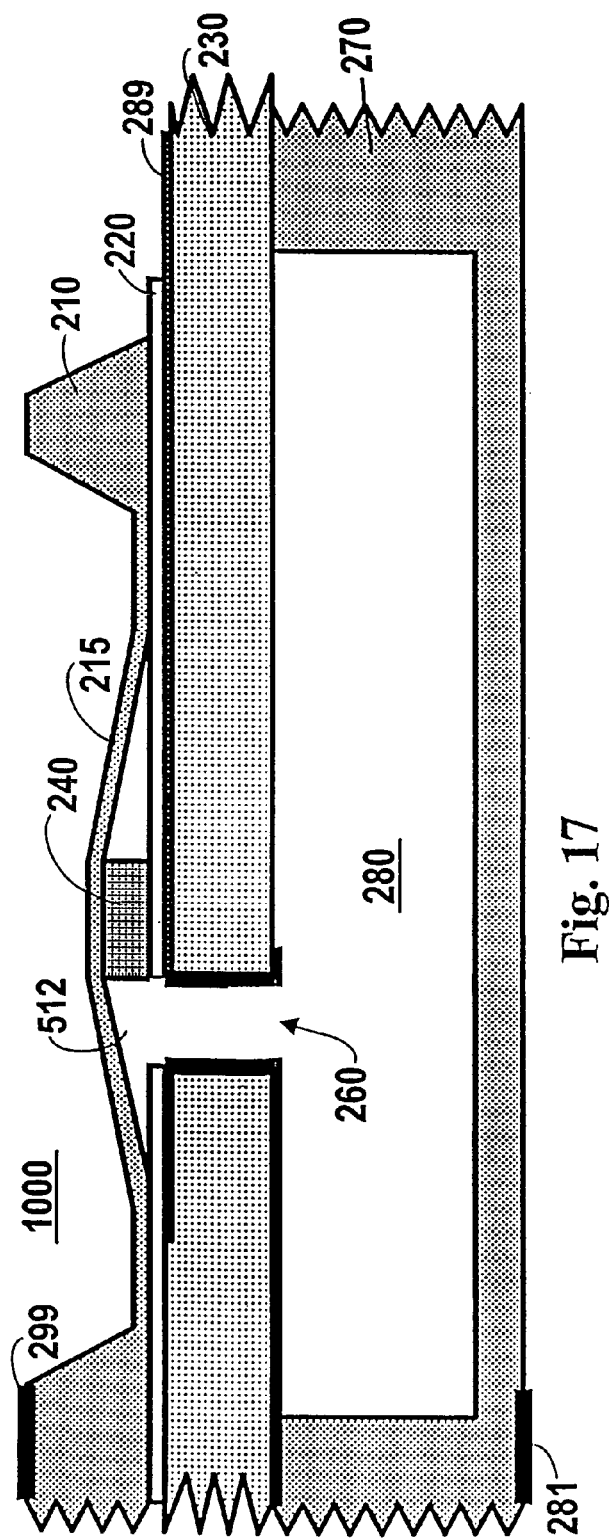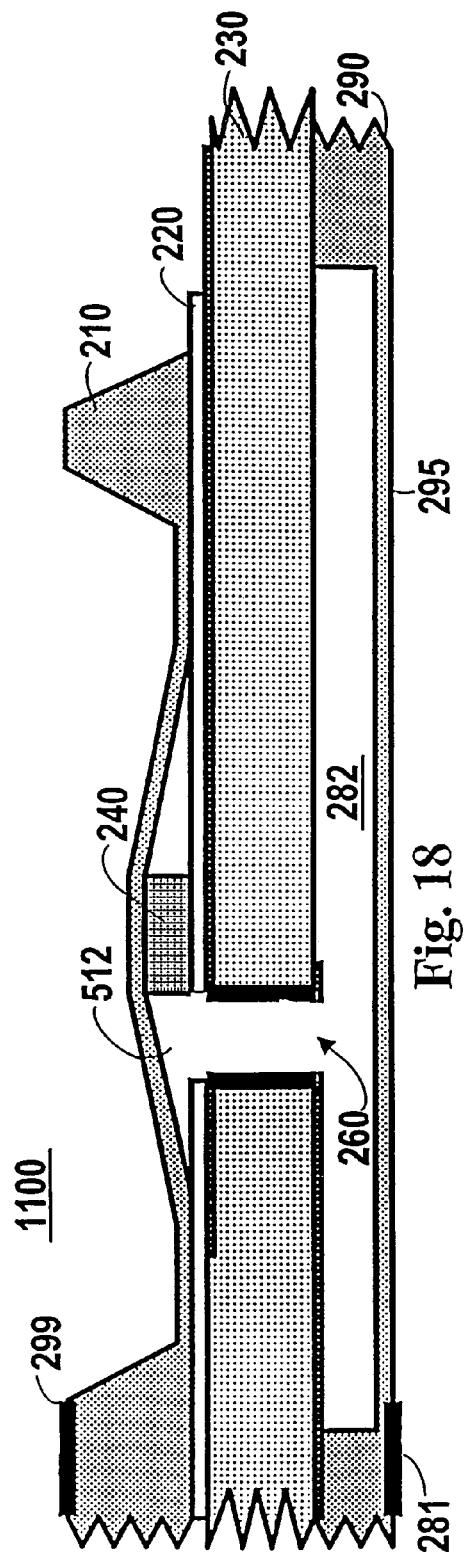

MICRO-ELECTROMECHANICAL SENSOR

RELATED APPLICATIONS

This is a divisional application of U.S. application Ser. No. 10/198,304, filed Jul. 17, 2002, now U.S. Pat. No. 7,047,814 which claims priority to U.S. provisional patent application Ser. No. 60/306,175, filed on Jul. 17, 2001, both of which are herein incorporated by reference in their entirety.

FIELD OF THE INVENTION

The present invention relates generally to the field of micro-electromechanical systems (MEMS). More specifically, the present invention relates to micro-electromechanical variable capacitive sensors.

BACKGROUND OF THE INVENTION

Transducers are generally devices that convert an input of one form of energy into an output of another form of energy. Many types of transducers are available for converting light to electrical signals, mechanical energy to electrical signals, temperature to pressure, pressure to electrical signals, acceleration to electrical signals, electrical signals to motions, etc., and vice versa. Equipment or apparatus that operates between different types of energy generally requires one type of transducer or another. Based upon the application, transducers can range from inexpensive to very expensive, depending on the precision, accuracy, sensitivity, and reliability required.

A pressure transducer, in general, is a device that senses pressure and converts it to electrical energy. A type of conventional pressure transducer is a capacitive displacement transducer, an example of which is shown in FIGS. 1A and 1B. The conventional transducer has two glass strata 10 that sandwich a silicon stratum 12 metal electrodes 14 and 16 form the positive and negative capacitor plates, respectively. Silicon stratum 12 forms a thin diaphragm and similarly shallow gaps separate the diaphragm from the capacitor plates. The diaphragm deflects in response to the pressure difference between the two sides of the diaphragm. The deflection varies the separation between the diaphragm and the electrodes, diminishing one capacitance while increasing the other. The capacitances of the transducer, and thus the pressure associated with the capacitances, can be measured by using appropriate circuitry. A more detailed description of a capacitive displacement transducer device can be found in U.S. Pat. No. 4,996,627, entitled "High Sensitivity Miniature Pressure Transducer," which is hereby incorporated by reference.

One problem associated with such conventional transducer structures is thermal-mechanical mismatch between glass and silicon. Low pressure sensing requires a high aspect ratio diaphragm (e.g., high radius to thickness ratio) that acts as a tensile spring, the stiffness of which is mainly determined by its tension. Glass and silicon, however, do not have identical thermal expansion properties, and their differences can significantly affect the tension of the diaphragm. As a result, the accuracy of low pressure sensing transducers made with a glass-dominated structure varies, sometimes unpredictably, as a function of temperature. Tension in the diaphragm also varies from transducer to transducer, as it is difficult to precisely recreate the same tension in the diaphragms.

Also, most conventional transducers exhibit a constant sensitivity to the measured variable, e.g. pressure. Conventional pressure transducers, have output signals that generally increase linearly with applied pressure. The largest inaccuracy in conventional pressure transducers is composed of common-mode or absolute errors, the sources of which are independent of pressure. This type of inaccuracy or error appears to be the same at every point in the measured range. Therefore, when expressed as a percent of reading, the error is smallest at the maximum pressure and highest at the minimum pressure. When the minimum pressure is zero, the error is then infinite. However, many applications require a transducer with great accuracy at the low end of the pressure range. Normal-mode inaccuracy appears as the same error percentage at every point in the measured range because the absolute error is reduced at the low pressure range. A transducer exhibiting only normal mode error is said to exhibit high "dynamic range". Given a maximum allowed percentage inaccuracy, dynamic range is expressed as the number of orders of magnitude of measured range for which a transducer measures within that accuracy. The resulting output signal characteristic is "log-linear" with respect to pressure. A highly sensitive pressure transducer that provides such a log-linear signal characteristic also exhibits maximum dynamic range. However, the art has failed to provide a micro-sensor that is relatively reproducible and cost effective to manufacture, while exhibiting the low range accuracy of relative error device.

SUMMARY OF THE INVENTION

An embodiment of the present invention is a variable capacitive micro-electromechanical transducer. In particular, a transducer according to the invention comprises a substrate that acts as an electrode of a capacitor, a dielectric material disposed on the substrate, a spacing member disposed on the dielectric material, and a resilient element disposed on the dielectric material as another electrode. A portion of the resilient element is separated from the dielectric material, while another portion of the resilient element is in contact with the dielectric material. In one embodiment, the contact area between the resilient element and the dielectric material, which approximately constitutes an effective electrode area for the capacitor, corresponds to a difference between the amount of an external force that is exerted on the resilient element and a component of the tension in the resilient element. The transducer capacitance can be readily measured, and the tension in the resilient element can be deduced from the transducer capacitance. Thus, the amount of external force that is exerted on the resilient element can be calculated from the transducer capacitance.

Unlike conventional capacitive displacement transducers, in which the tension of the resilient element is primarily determined by the dimensions of the resilient element, the tension of the resilient element of the present invention is secondarily determined by the dimensions of the resilient element and is primarily determined by the height of the spacing member. The dimensions of the resilient element and, to an even greater degree, the height of the spacing member can be finely controlled and reproduced using MEMS and other semi-conductor device fabrication processes and techniques. Therefore, the accuracy and precision of the pressure transducer of the present embodiment are dramatically improved over those of conventional pressure transducers.

Movement of the resilient element can be effected by many different means including changes in pressure, acceleration, etc. Thus, the transducers of the present invention can be configured as pressure transducers, accelerometers, densimeters, fluid flow meters, etc.

In one embodiment of the present invention, the spacing member may be positioned approximately at the center of the resilient element. In this embodiment, the central portion of the resilient element is separated from the dielectric material by the spacing member, and a peripheral portion of the resilient element is in contact with the dielectric material. According to the present invention, a transducer having this configuration has a higher sensitivity to force changes at lower force ranges. In the present invention, the transducer configuration preferably exhibits a log-linear sensitivity to applied force, which can maximize dynamic range.

In another embodiment of the present invention, the spacing member may be positioned along a peripheral portion of the resilient element such that its peripheral portion is separated from the dielectric material. In this embodiment, the central portion of the resilient element is in contact with the dielectric material. According to the present invention, a transducer having this configuration has a higher sensitivity at higher force or pressure ranges.

In yet another embodiment of the invention, the spacing member may include two parts. One part is positioned approximately at the center of the resilient element, and another part is positioned along the peripheral region of the resilient element. In this embodiment, the contact area assumes an annular shape. The spacing member of such a transducer can be sized and positioned so that the transducer exhibits linear sensitivity to force or pressure.

In some embodiments, dielectric material may be disposed on the surface of the resilient element that faces the substrate. In these embodiments, the spacing member may be used to separate portions of the dielectric material and the resilient element from the substrate. The effective electrode area is approximately the contact area between the dielectric material and the substrate.

Another embodiment of the present invention is a pressure transducer for measuring differential pressure between two fluids. The pressure transducer of this embodiment includes a substrate that acts as a capacitor-electrode and resilient elements for bi-directional response disposed on opposite sides of the substrate. The resilient elements, which act as movable electrodes, and the substrate form two capacitors that share a common electrode. The transducer further includes openings through the substrate to allow the resilient elements to be exposed to both of the fluids. Differential pressure can be measured by measuring the capacitances of the two capacitors. In one preferred embodiment, the substrate is made of glass with a metallized layer, and the resilient elements are formed as diaphragms made of silicon. In this embodiment, the transducer can be constructed as an "all silicon structure" from silicon wafers. All silicon structures, which are composed of forms of silicon commonly found in MEMS and integrated circuits, would be less prone to the thermal-mechanical mismatch between glass and silicon.

In yet another embodiment of the present invention, a pressure transducer for measuring differential pressure includes a substrate, a resilient element disposed on one side of the substrate, and an isolator disposed on another side of the substrate. In a preferred embodiment, the isolator is formed as a membrane that prevents external fluids, which may alter the capacitance of the transducer or may chemically interact with the transducer, from being interposed between the resilient element and the substrate. A gauge fluid may be contained in the volume enclosed by the resilient element and the isolator to communicate pressure between the isolator and the resilient element. Once again, the resilient element may be formed as a diaphragm.

These and other embodiments of the present invention will be further described below.

BRIEF DESCRIPTION OF THE DRAWINGS

For a better understanding of the invention, reference should be made to the following detailed description taken in conjunction with the accompanying drawing(s), in which:

FIG. 10A is a side cross-sectional view of a processing step for fabricating a transducer, illustrating a base structure;

FIG. 10B is a side cross-sectional view of a processing step for fabricating a transducer, illustrating a diaphragm-stratum;

FIG. 10C is a side cross-sectional view of the completed process for fabricating a transducer, according to an embodiment of the present invention;

FIG. 13 is a side cross-sectional view of a transducer that is configured to sense differential pressure according to another embodiment of the present invention;

FIG. 14 is a top plan view of the transducer of FIG. 13;

FIG. 17 is a side cross-sectional view of a transducer that is configured to sense compressible fluid density according to a further embodiment of the present invention;

FIG. 18 is a side cross-sectional view of a transducer that is configured to sense differential pressure of hostile or sensitive fluids according to another embodiment of the present invention;

DESCRIPTION OF THE PREFERRED EMBODIMENTS

Figure 1A:
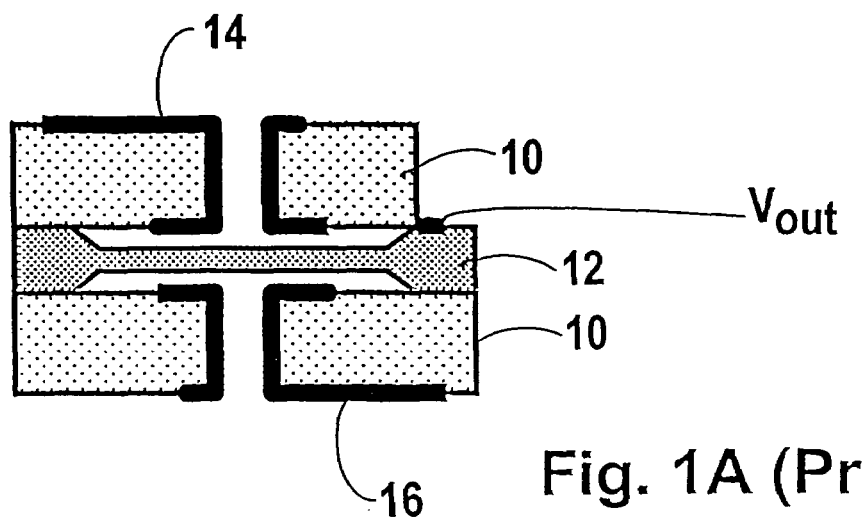
FIG. 1A is a cross sectional view of a prior art displacement capacitive pressure transducer.
Figure 1B:
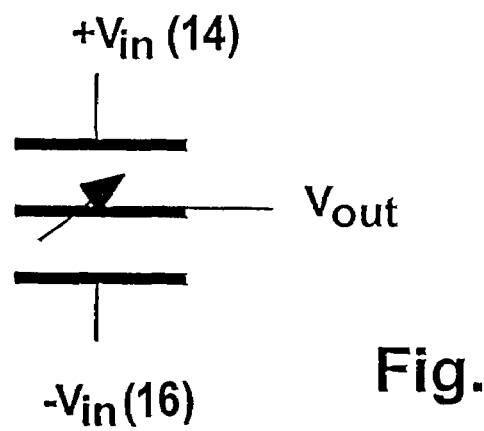
FIG. 1B is schematic diagram illustrating a circuit equivalence of a prior art displacement capacitive pressure transducer.
Figure 2:
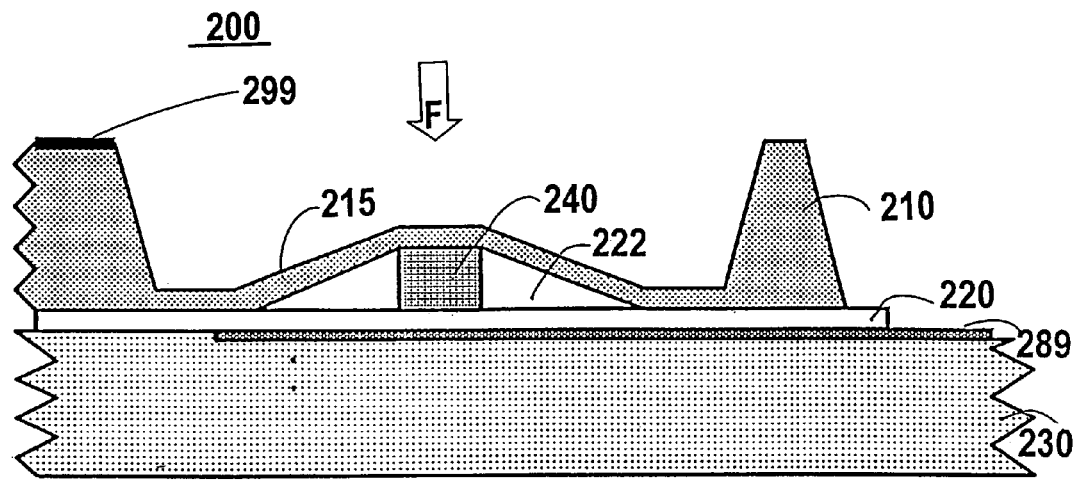
FIG. 2 is a side cross-sectional view of a transducer configured to sense absolute pressure according to one embodiment of the present invention.

As shown in FIG. 2, transducer 200 according to an embodiment of the present invention comprises substrate 230, a dielectric 220 (which may be disposed on the substrate 230), spacing member 240, and resilient stratum 210 disposed over the dielectric 220. In the illustrated embodiment, substrate 230 includes an optional conductive layer 289 that acts as an electrode of the capacitor. The resilient stratum 210 includes a diaphragm portion 215 that is configured to act as another electrode of the capacitor. The diaphragm portion 215 is at least partially separated from the dielectric 220 by spacing member 240. As shown in FIG. 2, dielectric 220 comprises a layer of a dialectic material, which may be selected by a person skilled in the art from know dielectric materials. Alternatively, dielectric 220 may be configured as a vacuum layer. Void 222, which is created by spacing member 240 between diaphragm portion 215 and dielectric 220, may be evacuated or may contain a displaceable or compressible non-conductive fluid (e.g., air), preferably at an initial predetermined pressure. Capacitance measuring circuitry may be coupled to the transducer 200 via electrical contact 299 and conductive layer 289 as will be appreciated by those of ordinary skill in the art.

According to the present embodiment, tension causes diaphragm portion 215 to act as a spring or resilient element that resiliently deforms in response to external forces (e.g., pressure). Tension also assists the diaphragm portion 215 to "spring back" to its original shape when the external forces are removed. In other words, this tension affects how much the diaphragm portion 215 will bend and come into contact with the layer of dielectric material in response to an external force. In the present embodiment, the tension in the diaphragm portion 215 is determined primarily by the height of the spacing member 240 and also by the dimensions (e.g., radius and thickness) of the diaphragm portion 215. The height of the spacing member 240 and the dimensions of diaphragm portion 215 can be finely controlled and reproduced using known MEMS fabrication processes and semiconductor device fabrication processes. Therefore, the accuracy and precision of a transducer of the present embodiment are dramatically improved over those of conventional transducers.

In general, for MEMS applications the diameter of the diaphragm portion will be not greater than about 5 mm, typically between about 50 microns to 5 mm, perhaps lower for nano-applications (e.g. 5 microns). Typical heights and diameters for the spacing member may be about 1-5 microns and 30-70 microns, respectively. Strain, an indicator of tension in the diaphragm portion, is preferably in the range of about 0.001%-0.1%. In one preferred embodiment, configured for low pressure sensing (e.g., full scale pressure in the range of about one inch of water column or less, approximately 0.035 psi), the thickness of diaphragm portion 215 may range from less than a micron (e.g., 0.1 micron) to more than ten microns, and the area of the diaphragm portion may be more than one square millimeter (1 mm$^2$). More specifically, the diameter is about 1 mm. The height and diameter of spacing member 240 is about 3 microns and 50 microns, respectively. At these dimensions, the strain in the diaphragm portion is about 0.01%.

Figure 3:
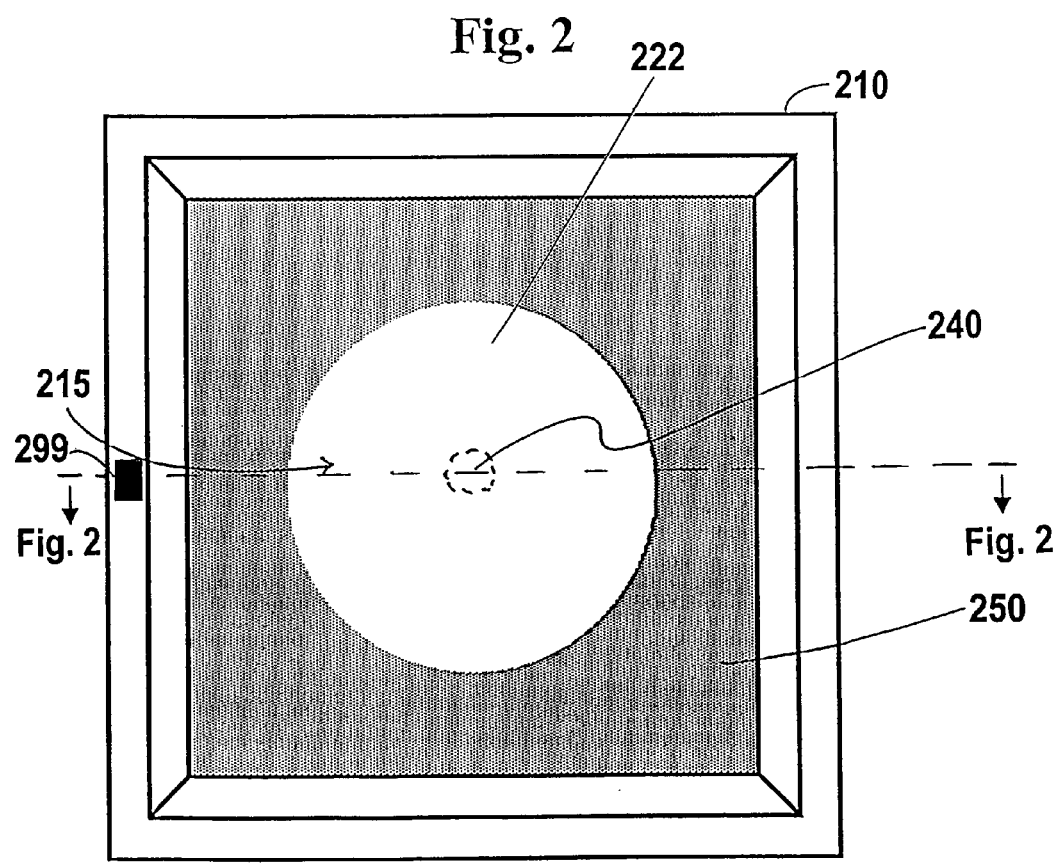
FIG. 3 is a top view of the transducer of FIG. 2 according to the present invention.

FIG. 3 depicts a top view of the diaphragm portion 215 and illustrates contact area 250 (shaded gray) between the diaphragm portion 215 and the dielectric 220. The white circular area thus represents void 222. Although spacing member 240 is shown in hidden lines to be cylindrical in shape, located beneath approximately the center of diaphragm portion 215, it should be understood that in alternative embodiments, spacing member 240 may be located at any position under diaphragm portion 215, and may be configured in other than cylindrical shape. For example, multiple spacing members may be located between diaphragm portion 215 the substrate 230 to define contact area 250.

Figure 4:
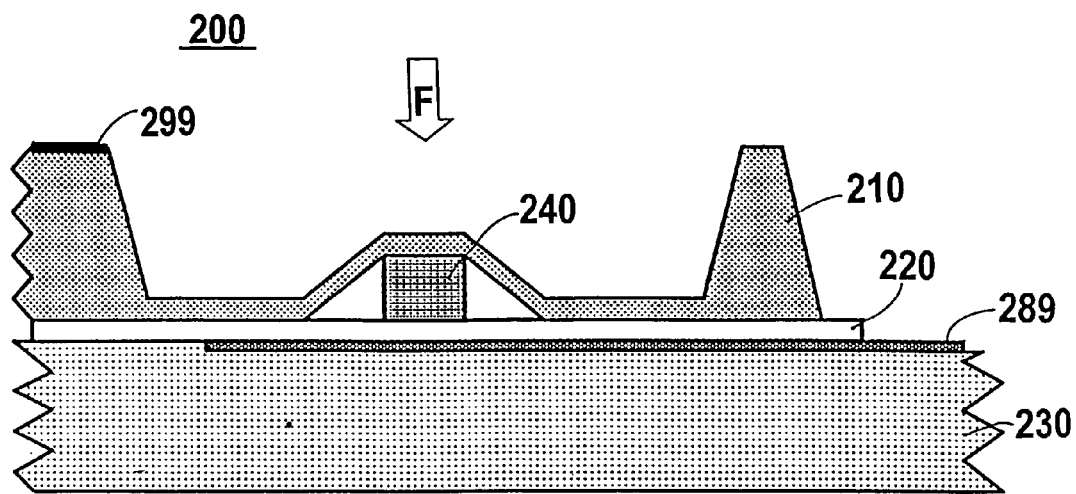
FIG. 4 is a side cross-sectional view of the transducer of FIG. 2 according to the present invention showing a greater applied force.
Figure 5:
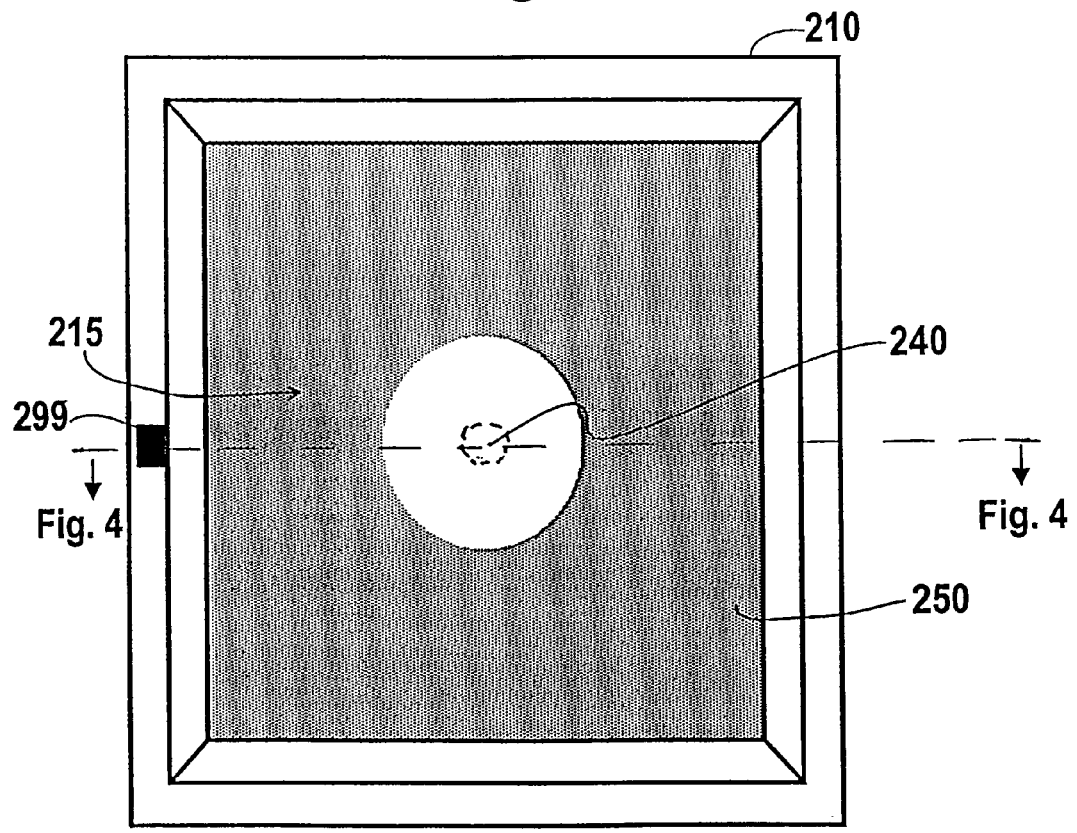
FIG. 5 is a top view of the transducer of FIG. 4 according to the present invention.

The size of contact area 250 varies in response to the amount of force exerted on the diaphragm portion 215. As the amount of force exerted increases, a larger part of the diaphragm portion 215 presses against the dielectric material 220, increasing the size of the contact area 250. The capacitance of the device is determined by the amount of the diaphragm portion in contact with the dielectric material. Thus, force exerted to increase contact area 250 increases the effective electrode area and capacitance of the transducer 200 correspondingly. FIGS. 4-5 thus illustrate transducer 200 with larger external force exerted on diaphragm portion 215. As will be appreciated, decreasing the force on diaphragm portion 215 decreases the contact area 250 resulting in a corresponding decrease in the effective electrode area and capacitance of transducer 200. Therefore, the amount of force exerted on the diaphragm 215 can be determined by measuring the capacitance of the transducer 200.

Capacitance of transducer 200 may be measured by coupling the diaphragm portion and substrate to a capacitance measuring circuit, which is well known in the art. In some embodiments, the transducer 200 may be calibrated by measuring its capacitance while applying known amounts of force on the transducer and determining a correlation function between the measured capacitances and the amounts of force applied. In other embodiments the capacitance may be held at a predetermined constant value by applying a voltage to the capacitor so that the attendant electrostatic force causes the capacitance to increase and approach the predetermined constant value. The voltage required to reach the predetermined capacitance may also be calibrated to represent the force or pressure applied to the transducer.

In the embodiment illustrated in FIGS. 2-5, as discussed above, contact area 250 increases with increasing applied force as the contact radius decreases. Diaphragm portion 215 becomes stiffer as contact area 250 increases and the area in contact increases at a decreasing rate with incremental contact radius decrease. Diaphragm portion 215 deflects until the sensed force is balanced by the net, normal component of the tension in diaphragm portion 215.

In this preferred embodiment the increase in tension, as diaphragm portion 215 deflects, gives rise to non-linear characteristics of the transducer. Thus, the first increment of contact area change is the largest, and capacitance increases at a decreasing rate with increasing force. Taking advantage of these unique properties, sensors made according to the present invention may be used to accurately sense very small forces and force changes because the sensor response results in a relative or normal-mode error condition. For example, when the actuating force to be sensed is pressure, the present embodiment provides the greatest differential capacitance to pressure ration (dC/dP) at the low pressure range, resulting in a substantially uniform relative error function across the entire pressure range. Depending on selection of parameters such as spacing member height and diaphragm dimensions and materials, the resulting change of output capacitance may be controlled as approximately proportional to the logarithm of the sensed force. This configuration is particularly useful to applications where a high dynamic range (i.e., high measurement resolution over several orders of magnitude) is desired. A high dynamic range signal configuration may be best for applications where the sensed variable varies by an exponential that is less than unity with the measured variable. For example, transducer 200 is suitable for measuring fluid flow rate, which is proportional to the square-root of the sensed fluid pressure ($P^{1/2}$). Thus, transducer 200 may be incorporated into fluid flow meters and fluid flow controllers.

Figure 6:
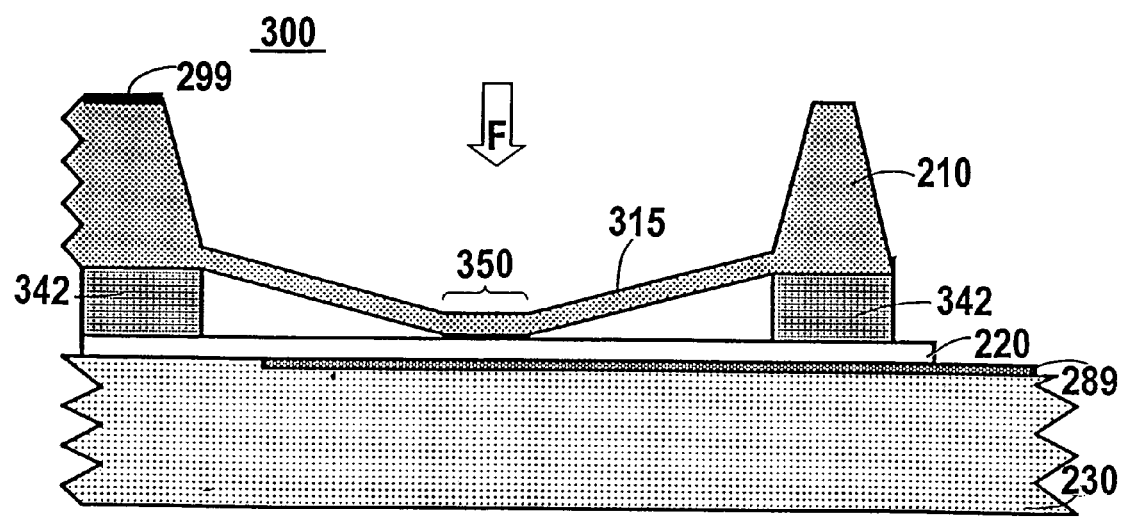
FIG. 6 is a side cross-sectional view of a transducer that is configured to sense absolute pressure according to another embodiment of the present invention with an applied force shown.
Figure 7:
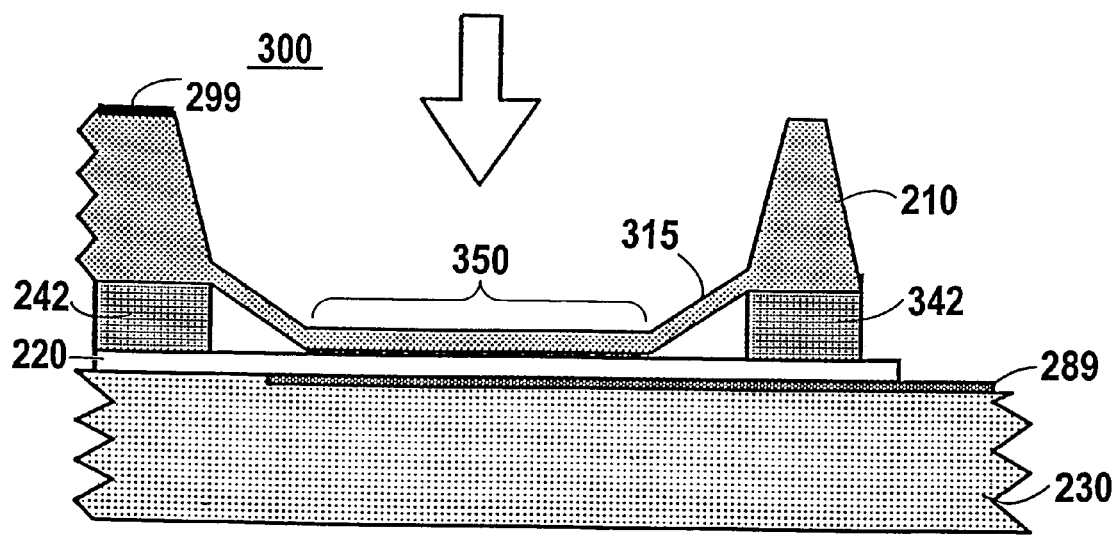
FIG. 7 is a side cross-sectional view of the transducer of FIG. 6 with a greater applied force.

FIGS. 6 and 7 illustrate a transducer 300 according to another embodiment of the present invention. In general, transducer 300 is constructed in similar fashion to transducer 200, but with the variations discussed below. In transducer 300, the peripheral part of a diaphragm portion 315 is separated from the dielectric material 220 by a peripheral spacing member 342 that is positioned around the perimeter of diaphragm portion 315. The central part of diaphragm portion 315 is in contact with the dielectric material 220 to form contact area 350. In one embodiment, a small central part of diaphragm portion 315 maybe fixedly bonded to the dielectric material 220 to define a minimum contact area 350 and thus ensure a minimum capacitance. Once again, the size of the contact area 350 varies with the amount of force exerted on the diaphragm portion 315, and the size of the contact area 350 determines the capacitance of the transducer 300.

In an embodiment such as transducer 300, contact area 350 increases as the contact radius increases and diaphragm portion 315 becomes stiffer with increasing applied force. The dominant signal-shaping phenomenon results from the contact area increasing at an increasing rate with incremental contact radius increase. Therefore, capacitance increases at an increasing rate with increasing force. This configuration may be most suitable for applications where the sensed variable varies by an exponential that is greater than unity with the measured variable. For example, transducer 300 is suitable for measuring fluid quantity in tanks that are larger at the bottom than at the top and/or measuring fluid quantity in tanks having a constant volume to depth ratio wherein the fluid contained has a density proportional to its depth.

According to the embodiment of FIGS. 6 and 7, peripheral spacing member 342 may be made of the same material as spacing member 240. That is, the peripheral spacing member 342 may be a separate structure or a metal or oxide deposited on substrate 230 or dielectric layer 220 in a precise and controlled fashion.

Figure 8:
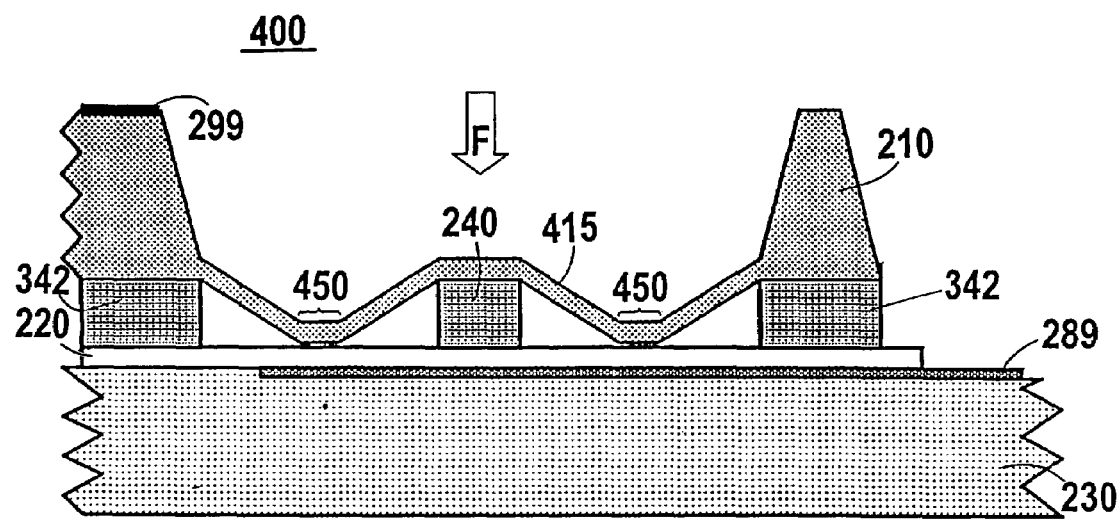
FIG. 8 is a side cross-sectional view of a transducer with an applied force according to a further embodiment of the present invention.
Figure 9:
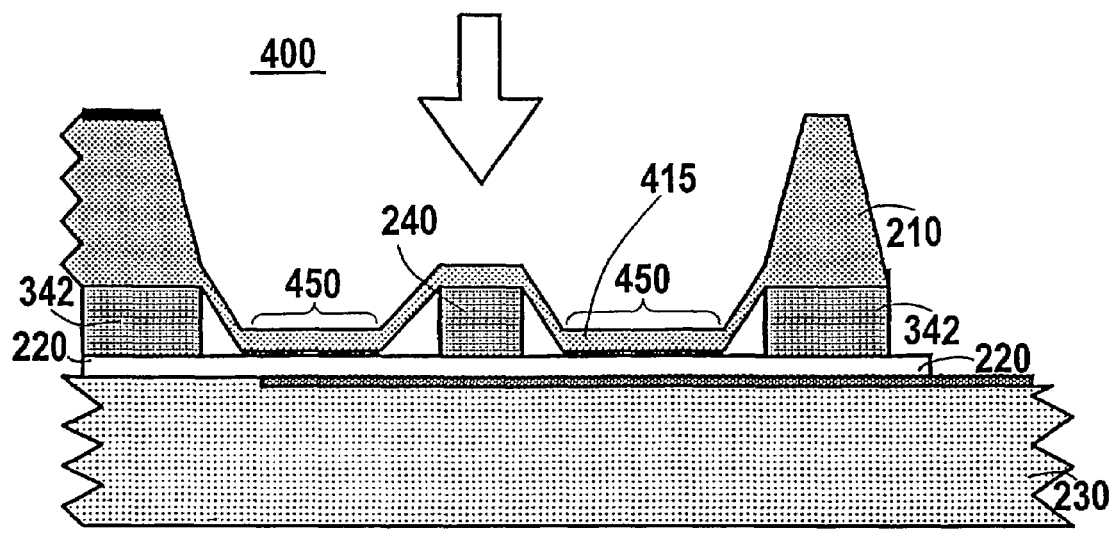
FIG. 9 is a side cross-sectional view of the transducer of FIG. 8 with a greater applied force.

FIGS. 8 and 9 illustrate transducer 400 according to yet another embodiment of the present invention. In this embodiment, diaphragm portion 415 is elevated both at a central point and around a peripheral part by central spacing member 240 and peripheral spacing member 342, respectively, to define contact area 450 with an annular shape. Diaphragm portion 415 may be bonded to dielectric layer 220 over a predetermined area to ensure a minimum contact area and capacitance. As depicted in FIGS. 8 and 9, the size of contact area 450 varies with the amount of force exerted on diaphragm portion 415. This configuration may be most suitable for applications requiring a linear response to applied force. The contact radius without applied force can be chosen so that signal-shape is linear with applied force.

It will be appreciated that the movement of the diaphragm portion of the embodiments described herein can be effected by many different means including changes in fluid pressure, acceleration, etc. Thus, the embodiments of the present invention can be configured as absolute pressure sensors, differential pressure sensors, accelerometers, densimeters, thermometers, flow controllers, etc.

Transducers according to the present invention can be fabricated using known MEMS manufacturing processes and/or other known semiconductor device fabrication processes. Processes for fabricating the transducers according to the present invention may differ depending on the applications and utilities of the transducers that the process is designed to make. For example, a flow controller incorporating embodiment(s) of the present invention may preferably be fabricated using an alloy bonding process, whereas a densimeter incorporating embodiment(s) of the present invention may preferably be fabricated using an anodic bonding process. The materials used for making the transducers of the present invention may also differ depending on the intended applications and utilities.

FIGS. 10A-C depict an exemplary series of process steps for fabricating a transducer according to the invention, such as transducer 200 of FIGS. 2-5. Substrate 230 is first provided. As may be determined by a person of ordinary skill, substrate 230 may include a non-conducting substrate (e.g., glass substrate) having a conductive layer (e.g., a metallized layer). Metallized glass wafer, single crystal silicon wafer and/or other suitable materials may be used as the substrate 230. In one embodiment, the substrate 230 is made with a glass material with a thermal-expansion coefficient that closely matches that of silicon.

As shown in FIG. 10A, a base structure 510 may be fabricated by first forming or depositing dielectric material 220 on substrate 230, and then forming the spacing member 240 thereon. Such a process is particularly useful where substrate 230 is a metallized glass substrate. The layer of dielectric material 220 may be a layer of silicon dioxide or a layer of silicon nitride. Other insulators with high dielectric constant can also be used.

Resilient-stratum 210, shown in FIG. 10B, may be fabricated by etching a silicon-on-insulator (SOI) wafer, a single crystal silicon wafer, or polysilicon wafer. A dry gaseous isotropic deep etching process may be used. A portion of the resilient-stratum 210 may be metallized to form an electrical contact 299. In an alternative embodiment, spacing member may be formed on or as part of resilient-stratum 210.

The resilient-stratum 210 and the base structure 510 are then bonded together as shown in FIG. 10C. Anodic bonding and/or alloy bonding processes may be used to bond the resilient-stratum 210 and the base structure 510 together.

As mentioned, the tension in diaphragm portion 215 is primarily determined by the height of spacing member 240 and also by the dimensions of the diaphragm portion. The height and dimensions can be accurately controlled and reproduced in many devices using known MEMS fabrication and/or semiconductor device fabrication processes and techniques. Because the height of spacing member 240 and the dimensions of the diaphragm portion 215 are accurately reproducible, transducers of the present invention with almost identical diaphragm tension can be mass produced.

Figure 11:
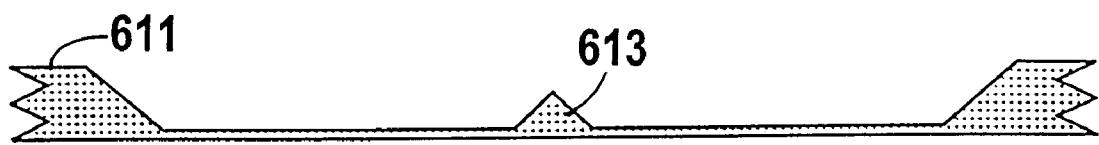
FIG. 11 is a side cross-sectional view of an alternative diaphragm-strata that may be used in an embodiment of the present invention.
Figure 12:
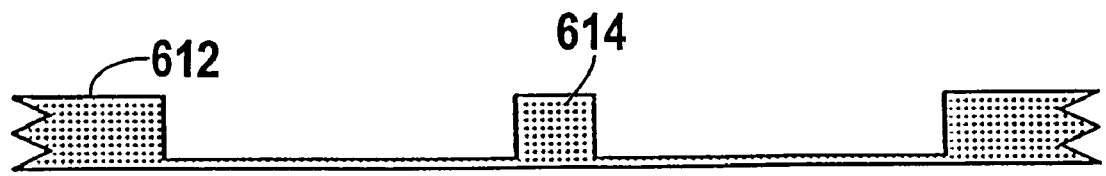
FIG. 12 is a side cross-sectional view of another alternative embodiment of diaphragm-strata that may be used in an embodiment of the present invention.

FIGS. 11 and 12 depict two alternative resilient strata 611 and 612 that may be used in embodiments of the present invention as alternatives to resilient strata 210 discussed above. For example, given their shapes, strata 210 and 612 are suitable for forming by dry etching. Stratum 611 is alternatively suitable for forming by wet-etching. Different patterns may be formed on the stratum and various materials (e.g., metals, metal oxides, etc.) can be deposited or grown thereon, such as protrusions 613 and 614, to vary the mechanical and/or electrical properties. Although the resilient strata have been discussed herein principally in terms of diaphragm-like configurations suitable for sensing pressure according to preferred embodiments of the invention, other shapes or structures may be suitable for sensing other types of forces. For example, in accelerometer applications, a bar or strip member may be employed. Also, to increase sensitivity in selected ranges, the mass may be altered, either uniformly or by adding mass concentrations. As an example, stratum 612 may be formed as a strip with protrusion 614 forming a mass concentration. When formed as a strip, stratum 612 may be secured to the substrate only at opposite ends, however when formed as a diaphragm the stratum is secured around its periphery.

In another alternative embodiment shown in FIGS. 13 and 14, transducer 700 also includes substrate 230, dielectric material 220 disposed on substrate 230 and spacing member 240 which comprise base structure 910. Resilient-stratum 210 is disposed on dielectric material 220 of the base structure. The resilient-stratum 210 forms diaphragm portion 215 stretched across spacing member 240 as previously discussed. In this embodiment, opening 260 is provided through substrate 230, communicating with void 512. (Spacing member 240 and opening 260 are illustrated by hidden lines in FIG. 19). With this arrangement, transducer 700 can be used to measure the differential pressure between two fluids on opposite sides of the device. When one surface 710 of diaphragm portion 215 is exposed to a first fluid, and when the opposite surface 712 is exposed to a second fluid that enters void 512 through opening 260, the differential pressure between the two fluids may be determined by measuring the capacitance of transducer 700.

Figure 15:
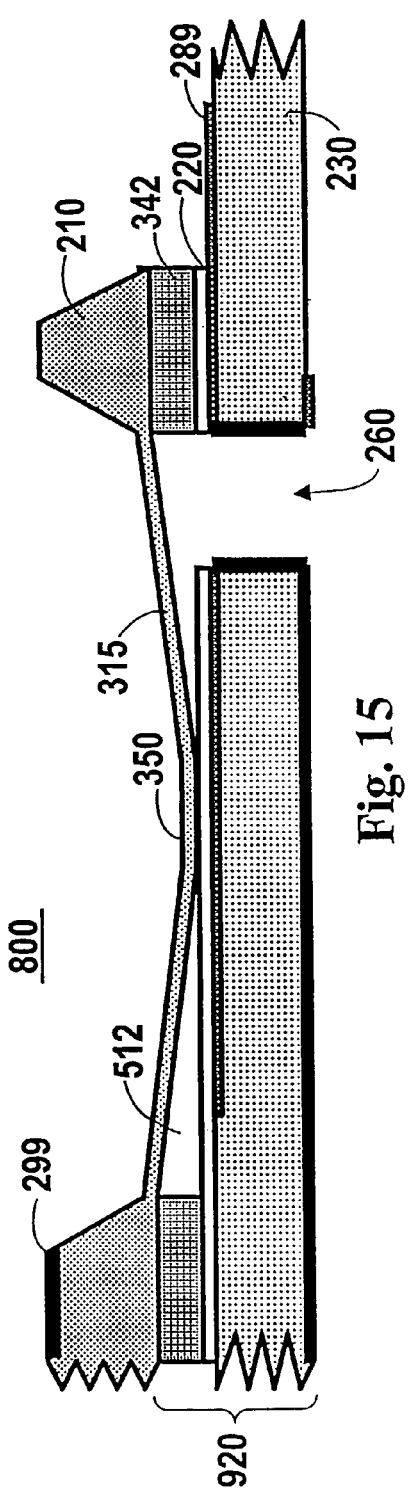
FIG. 15 is a transducer that is configured to sense differential pressure according to another embodiment of the present invention.
Figure 16:
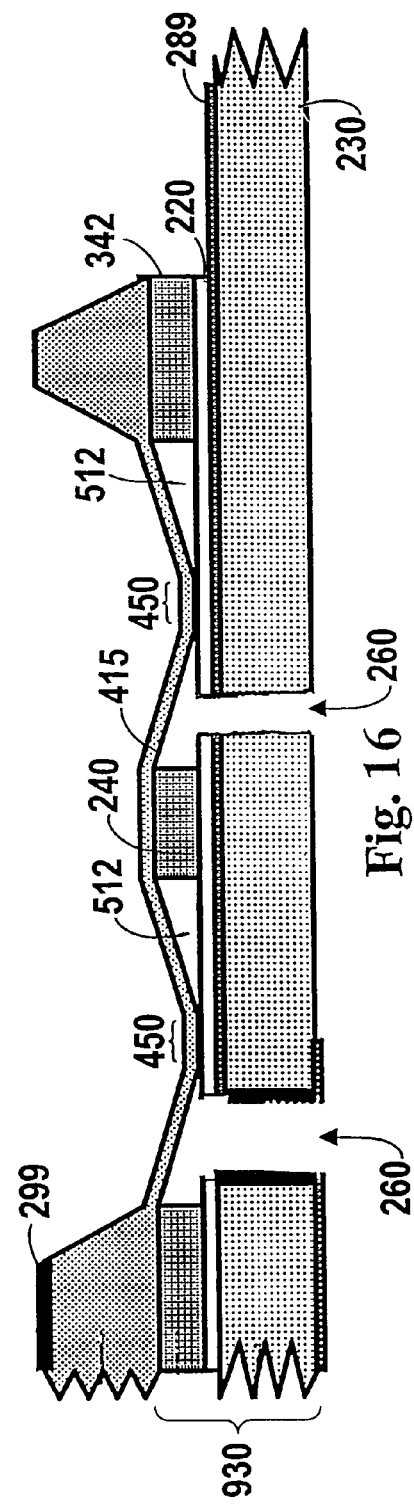
FIG. 16 is a transducer that is configured to sense differential pressure according to yet another embodiment of the present invention.

FIGS. 15 and 16 depict transducers 800 and 900 according to further alternative embodiments of the present invention. Transducer 800 includes base structure 920 with peripheral spacing member 342 and opening 260 for providing access to void 512. Transducer 900 includes base structure 930, with central spacing member 240, peripheral spacing member 342 and plural openings 260 communicating with the plural voids 512 formed by the annular shape of contact area 450. Both transducers 800 and 900 can be used for measuring the differential pressure between two fluids as discussed above with respect to transducer 700.

Transducers 700, 800 and 900 may be fabricated in a series of steps similar to those illustrated in FIG. 14. As mentioned, embodiments of the present invention can be made using different processes, and the processes used may differ depending on the applications for which transducers are designed. For example, either of resilient strata 611 or 612 may be bonded with any of base structures 910, 920 or 930. Fabricating techniques described above in conjunction with FIG. 14 may also be used to make transducers 700, 800 and 900. Other MEMS fabrication and semiconductor device fabrication processes and techniques may also be used.

In yet another embodiment of the present invention shown in FIG. 17, transducer 1000 includes silicon substrate 270 bonded to substrate 230 to define fixed-boundary chamber 280. A metal or metallized contact 281 may be provided on substrate 270 to allow coupling to an associated capacitance measuring circuit. When the substrates are assembled, chamber 280 may be initially filled with gaseous fluid, pressurized at a level slightly lower than a lowest external pressure to be sensed. Alternatively, chamber 280 may contain a vacuum. Chamber 280 is in communication with void 512 through opening 260. In this embodiment, diaphragm portion 215 deflects with little impedance until the differential pressure across the diaphragm 215 is balanced by the net, normal component of its tension, which opposes the differential pressure.

Preferably, the fluid in chamber 280 is identical to the fluid interfacing the outer surface of diaphragm portion 215. Also, diaphragm portion 215 is preferably sufficiently compliant so as to behave as a tonometric membrane, e.g. the skin of a perfect balloon. Such a tonometer supports neither a pressure gradient nor a temperature gradient across its thickness and therefore, the fluid density on both surfaces of the diaphragm portion must be the same. The larger the volume of gas in the chamber, the more the diaphragm portion must deflect to accommodate a change in density of the outer fluid. The larger the diaphragm portion deflection, the larger the change in capacitance. In this way, the transducer 1000 acts as a capacitive densimeter whose sensitivity is proportional to the volume of the fixed-boundary chamber 280.

A device such as transducer 1000 may be applied as the density correction component for flow measurement and control of a compressible fluid. Another component for flow sensing may be a differential pressure sensor configured like transducer 700 of FIG. 13. Monolithic sensors for sensing fluid flow may contain components configured in a manner similar to transducer 700 and to transducer 1000 so as to provide the function P/n, where P denotes differential pressure and n denotes the density of the fluid to be measured.

In another alternative embodiment shown in FIG. 18, transducer 1100 is also configured for measuring differential pressure between two fluids. This embodiment also includes substrate 230 that is configured to act as an electrode and diaphragm portion 215 that is configured to act as another electrode. However, a further substrate 290 is provided with an isolator diaphragm 295 to thus define variable-boundary chamber 282. Isolator diaphragm 295 may be fabricated as part of substrate 290, which is bonded to substrate 230. In one alternative, isolator diaphragm 295 is more compliant than diaphragm portion 215. A non-conducting gauge fluid is preferably contained in the void between diaphragm portion 215 and the isolator diaphragm 295. A person of ordinary skill in the art may select an appropriate material and process for fabricating diaphragm 295 based on its compatibility with the fluids to be isolated.

With reference still to FIG. 18, it will be noted that one surface of diaphragm portion 215 is exposed to a first fluid of interest. Thus, pressure of that fluid is directly communicated to the transducer. On the opposite side, one surface of isolator diaphragm 295 is exposed to a second fluid of interest, and the pressure of the second fluid of interest is communicated to the transducer via diaphragm portion 215 through isolator diaphragm 295 and the gauge fluid. Thus, this embodiment is particularly useful when the second fluid of interest may affect the dielectric constant of the dielectric medium between diaphragm portion 215 and the substrate 230 or otherwise be incompatible with the transducer layers.

Embodiments described above may be used as uni-directional sensors for sensing "positive" pressure. Generally, pressure is a scalar variable that acts equally in all directions. Increasing or decreasing pressure in one location relative to another may be referred to as the direction of pressure. Typically, if the fluid pressure to be sensed is increasing relative to a reference pressure, the sensed pressure is said to be becoming more positive. In embodiments described above, in a null condition at which diaphragm tension is produced solely by the spacing member (and gravity depending on the application), the capacitance of the transducers changes predictably in response to positive pressure changes.

Figure 19:
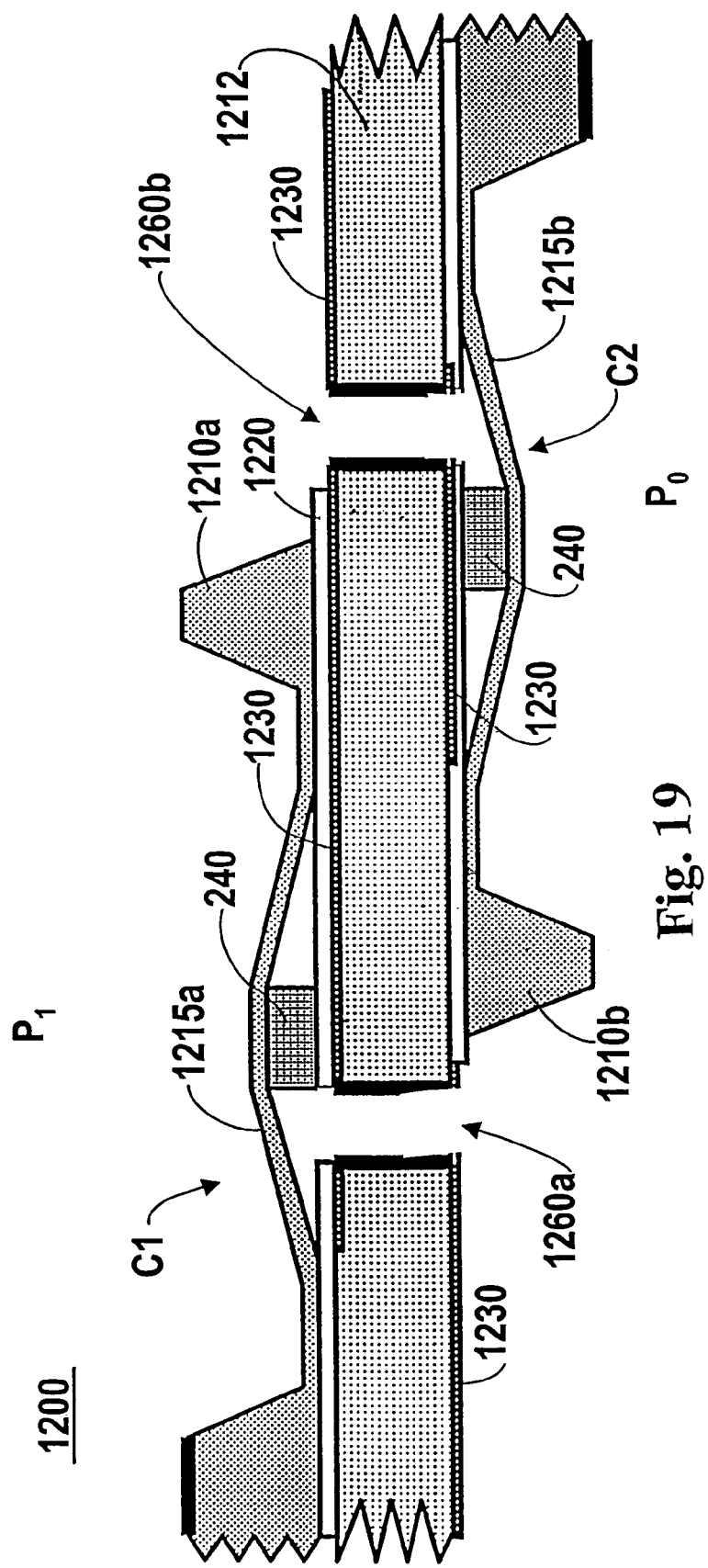
FIG. 19 is a side cross-sectional view of a pressure transducer that is configured to sense bi-directional differential pressure according to yet another embodiment of the present invention.

To more accurately sense bidirectional differential pressure changes, transducer 1200 according to a further alternative embodiment of the present invention is shown in FIG. 19. Transducer 1200 includes a tri-strata structure with two silicon resilient strata 1210a and 1210b and glass stratum 1212 therebetween. The glass stratum 1212, each surface of which preferably includes a layer of conductive material 1230 (e.g., metal), is configured to act as an electrode. Silicon strata 1210a and 1210b include diaphragm portions 1215a-1215b that are configured to act as movable electrodes in the same manner as discussed above. Diaphragm portion 1215a of silicon resilient stratum 1210a forms a first capacitor C1 with the conductive material 1230, and diaphragm portion 1215b of silicon resilient stratum 1210b forms a second capacitor C2 with the conductive material 1230. A thin layer of dielectric material 1220 may be disposed on the conductive material 1230 such that the diaphragms 1215a-1215b will not be in direct contact with the electrode 1230. Openings 1260a-1260b through the glass stratum 1212 may be optionally provided such that diaphragm portions 1215a-1215b are exposed at their interiors to the fluids of interest.

Transducer 1200 uses first diaphragm portion 1215a to sense pressure if $P_1$ is larger than or equal to $P_0$. This is because the effective electrode area, as well as the capacitance of C1 reaches a minimum point when the pressure difference ($P_1-P_0$) is zero and any further decrease is minimal as the pressure difference ($P_1-P_0$) becomes increasingly negative. When the pressure difference ($P_1-P_0$) is negative, transducer 1200 uses second diaphragm portion 1215b to sense the negative pressure because the effective electrode area, as well as the capacitance of C2 does not increase unless the pressure difference (P1-P0) is negative, and because the capacitance of C2 increases as the difference (P1-P0) becomes increasingly negative. As long as the pressure difference (P1-P0) is positive, the capacitance of C2 remains approximately constant. In an analogous manner, as long as the pressure difference (P1-P0) is negative, the capacitance of C1 remains approximately constant. Thus, changes in the pressure difference (P1-P0) are approximately proportional to changes in the capacitance of C1 or C2, depending on whether (P1-P0) is positive or negative.

Figure 20:
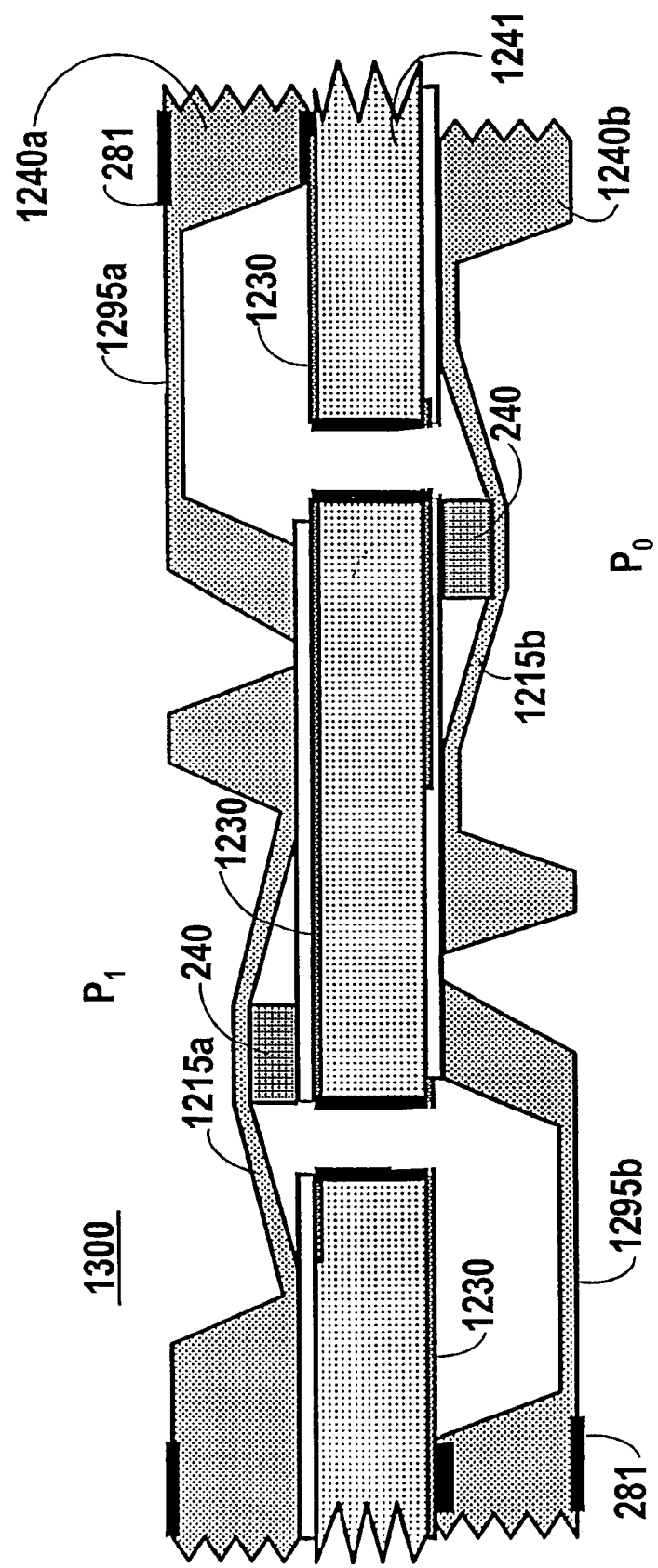
FIG. 20 is a side cross-sectional view of a differential pressure transducer that is configured to sense bi-directional differential pressure of hostile or sensitive fluids according to yet another embodiment of the present invention.

FIG. 20 depicts a differential pressure transducer 1300 in accordance with yet another embodiment of the present invention. In this embodiment, the transducer 1300 has two silicon resilient strata 1240a and 1240b disposed on opposite sides of glass stratum 1241. Transducer 1300 has two isolator diaphragms 1295a-1295b configured to prevent the inner surfaces of diaphragm portions 1215a-1215b from being directly exposed to the fluids to be measured. In this embodiment, a gauge fluid is contained in the void between diaphragm portions 1215a-1215b and the isolator diaphragms 1295a-1295b. As described above, the transducer 1300 uses diaphragm 1215a to sense pressure when the pressure difference (P1-P0) is positive, and uses diaphragm 1215b to sense pressure when the pressure difference (P1-P0) is negative.

In the embodiments illustrated, for example, in FIGS. 19-20, silicon-glass-silicon strata are used. However, it should be appreciated that other materials may be used as alternatives. Persons of ordinary skill in the art will be able to select appropriate materials combinations for particular applications based on the teaching of the present invention.

Figure 21:
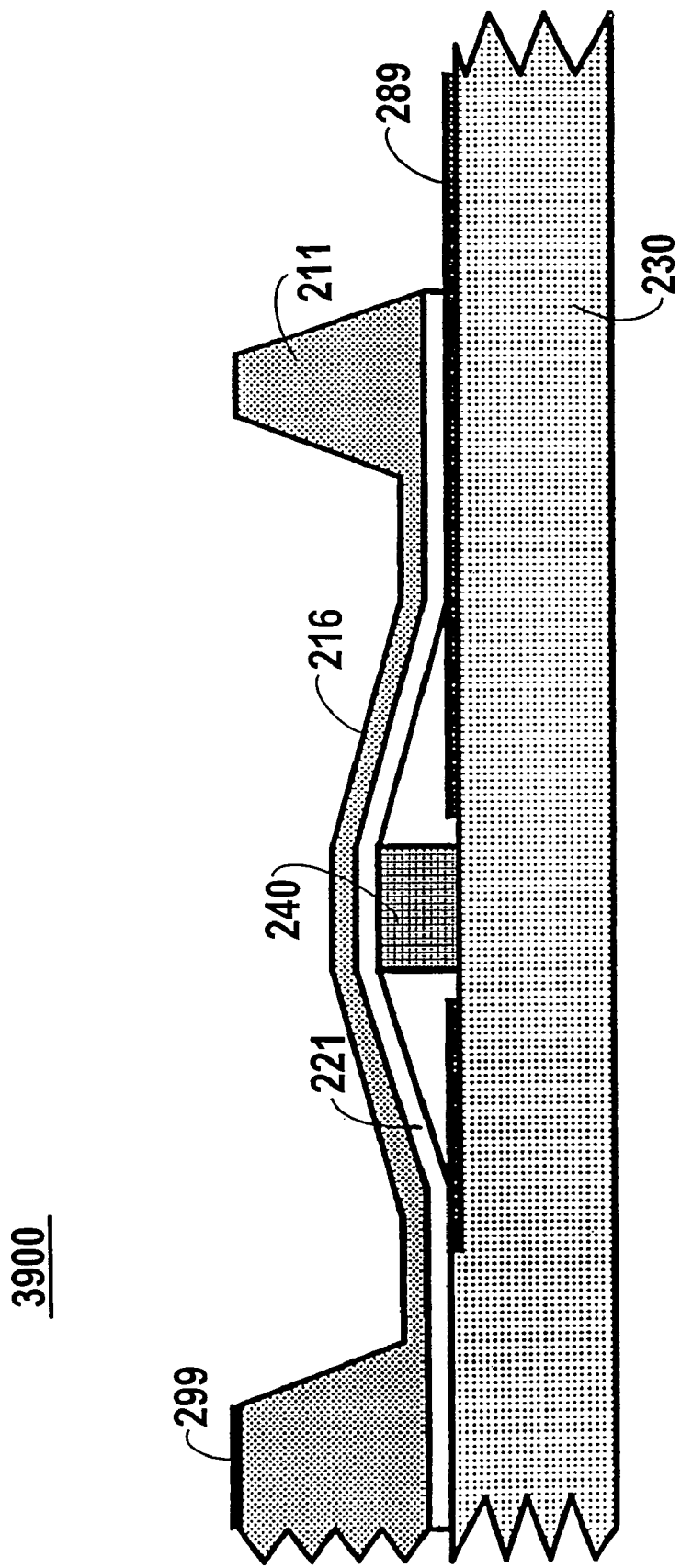
FIG. 21 is a side cross-sectional view of a transducer where the dielectric layer is disposed upon the resilient diaphragm according to yet another embodiment of the present invention.

Some embodiments of the present invention described above include a substrate that has a thin layer of dielectric material. Thus, in those embodiments, a spacing member separates the resilient element (e.g., a diaphragm) from the dielectric material. It should be noted that, in other embodiments, the layer of dielectric material may be deposited on the diaphragm or on both the diaphragm and the substrate. Transducer 3900 according to such an embodiment is illustrated in FIG. 21. Transducer 3900 includes substrate 230 that acts as an electrode of a capacitor with spacing member 240 disposed on (or formed as part of) the substrate. Resilient stratum 211 is disposed over substrate 230 and spacing member 240. Resilient-stratum 211 has a layer of dielectric material 221 attached thereto and a diaphragm portion 216 that acts as another electrode of the capacitor. Diaphragm portion 216 and the layer of dielectric material 221 are at least partially separated from substrate 230 by spacing member 240. The operation principles of the transducer 3900 are similar to those of other embodiments of the present invention described above.

Transducer 3900 can be fabricated using known MEMS manufacturing processes, preferably micromachining or other MEMS process known to those of ordinary skill in the art, and/or semiconductor device fabrication processes and/or combinations thereof. For example, substrate 230, which may be part of a metallized glass wafer, may be first provided. Spacing member 240 is then deposited on substrate 230, either as a separate structure or as an integrally created part with the substrate. Spacing member 240 may itself be metallic. Substrate 230 may be made with a glass material having a thermal-expansion coefficient that closes matches that of silicon. Alternatively, substrate 230 may be made with silicon to circumvent the thermal-expansion mismatch problem. Metal contact 289 may be deposited or bonded on the substrate either before or after spacing member 240 is added, depending on the technique employed to provide the spacing member.

Resilient-stratum 211 may be separately formed by etching a substrate, which is preferably part of a silicon-on-insulator (SOI) wafer. In one embodiment, a dry gaseous isotropic deep etching process is preferably used. The layer of dielectric material 221 may be formed on the surface of diaphragm portion 216 using known semiconductor device fabrication processes. In one embodiment, dielectric material 221 may be silicon nitride or silicon dioxide. Metal contact 299 is added at an appropriate processing step. The combined resilient-stratum 211 and dielectric material 221, and the base structure of substrate 230 and spacing member 240 may be bonded together to form the transducer 3900, preferably using anodic or alloy bonding.

Figure 22:
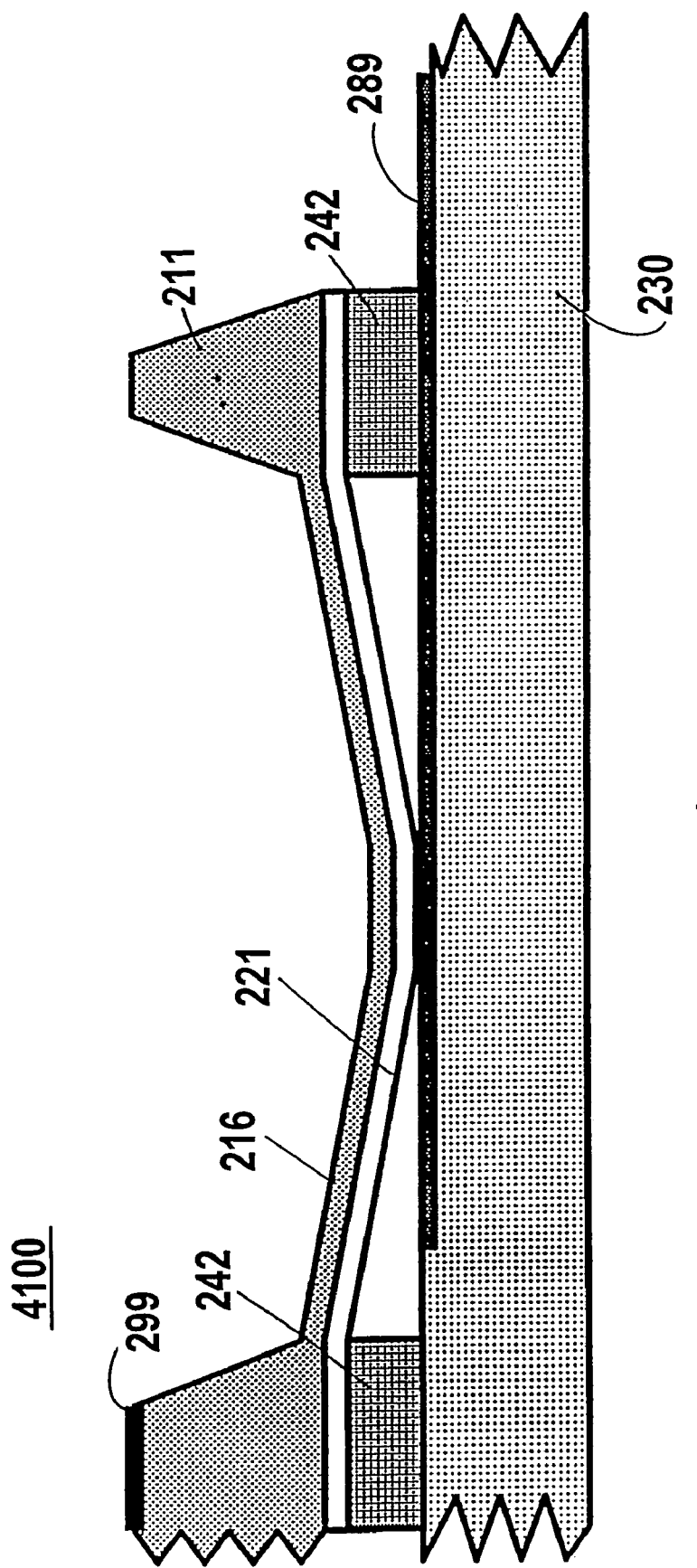
FIG. 22 is a side cross-sectional view of a transducer where the dielectric layer is also disposed upon the resilient diaphragm according to yet another embodiment of the present invention.

Transducer 4100 according to another embodiment of the present invention is shown in FIG. 22. Transducer 4100 is similar to transducer 3900 except that transducer 4100 has a peripheral spacing member 242 as previously described. Other spacer configurations are also possible. Transducer 4100 may be fabricated using processes similar to those described above.

The foregoing description, for purposes of explanation, uses specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. For instance, although some embodiments described and illustrated pertain to fluid pressure sensors, it should be understood that principles of the present invention may be applied to other areas such as accelerometers, air speed measuring devices, etc. Also, the fact that examples are given with respect to MEMS scale devices does not limit the scope or applicability of the invention. The principles and teachings of the present invention may be usefully applied on any scale. Many modifications and variations are possible in view of the above teachings.

What is claimed is:

1. A device, comprising:
   a substrate configured to act as a first electrode of a capacitor;
   a dielectric material layer, at least a portion of which is disposed on said substrate;
   a spacing member disposed on said dielectric material layer; and
   a resilient element configured to act as a second electrode of the capacitor, said resilient element disposed at an angle with respect to said substrate and tensioned over said spacing member and secured on said dielectric material layer, a portion of said resilient element being spaced from the substrate at a predetermined distance to define an effective capacitance area that varies in response to movement of said resilient element such that a capacitance proportional to said movement may be sustained between said substrate and resilient element,
   wherein portions of both said resilient member and said spacing member contact said dielectric material layer.

2. The device according to claim 1, wherein said resilient element is configured to provide at least a minimum effective capacitance area.

3. The device according to claim 1, wherein said movement occurs in response to a force applied to the resilient element and said capacitance is proportioned to the applied force magnitude.

4. The device according to claim 1, wherein said spacing member is a first spacing member and said resilient element is a first resilient element, said first member and element being disposed on a first side of said substrate, said device further comprising:
   a second spacing member disposed on a second, opposite side of the substrate; and
   a second resilient element tensioned over said second spacing member and secured with the second side of the substrate, a portion of said second resilient element being spaced from the substrate at a predetermined distance to define a second effective capacitance area that varies in response to a force applied to said second resilient element such that a capacitance proportional to the force may be sustained between said substrate and second resilient element.

5. The device according to claim 4, wherein said dielectric material layer comprises at least one dielectric material having a thickness disposed between the substrate and at least one resilient element, wherein said thickness corresponds to said predetermined distance.

6. The device according to claim 4, wherein said substrate defines first and second holes therethrough communicating with a backside of the first and second resilient elements, respectively.

7. The device according to claim 6, further comprising first and second fluid filled chambers disposed on opposite sides of the substrate, each chamber communicating with the backside of the associated first and second resilient elements through the first and second holes, respectively.

8. The device according to claim 7, wherein said chambers are defined by at least substantially rigid walls.

9. The device according to claim 7, wherein said chambers include a resilient wall such that pressure variations may be transmitted therethrough.

10. A device, comprising:
    a substrate configured to act as a first electrode of a capacitor;
    a spacing member positioned on one side of the substrate;
    a resilient element configured to act as a second electrode of a capacitor, said resilient element being disposed at an angle with respect to said substrate and over said spacing member and spaced from the substrate thereby to define an effective capacitance area between said substrate and element; and
    a dielectric material separate from said spacing member and disposed between the resilient element and the substrate, said dielectric material being in contact with the substrate and the resilient element over the effective capacitance area, wherein said area varies in response to a force applied to said resilient element such that a capacitance proportional to the applied force may be sustained between said substrate and resilient element.
    wherein portions of both said resilient member and said spacing member contact said dielectric material layer.

11. The device according to claim 10, wherein said substrate defines at least one hole therethrough communicating with a backside of the resilient element.

12. The device according to claim 11, further comprising a chamber disposed on the substrate opposite the resilient element, said chamber communicating with the backside of the resilient element through said at least one hole.

13. The device according to claim 12, wherein said chamber is defined by at least substantially rigid walls.

14. The device according to claim 12, wherein said chamber includes a resilient wall such that pressure variations may be transmitted therethrough.

15. A device, comprising:
    a substrate configured to act as a first electrode of a capacitor;
    first and second spacing members positioned on opposite sides of the substrate;
    first and second resilient elements, each configured to act as second electrodes of a capacitor, said resilient elements being disposed at angles with respect to said substrate and over said respective first and second spacing members and spaced from the substrate thereby to define first and second effective areas on opposite sides of the substrate; and first and second dielectric materials separate from said respective spacing members and respectively disposed between and in contact with the first and second resilient elements and the substrate over the respective effective areas, each effective area encompassing at least a portion of the respective resilient elements in contact with said resilient element and substrate, wherein said effective areas vary in response to a force applied to each said resilient element such that a capacitance proportional to the applied force may be sustained between said substrate and resilient elements, wherein portions of both said first resilient element and said first spacing member contact said first dielectric material, and portions of both said second resilient element and said second spacing member contact said second dielectric material.

16. The device according to claim 15, wherein said substrate defines first and second holes therethrough communicating with a backside of the first and second resilient elements, respectively.

17. A pressure transducer for measuring differential pressure between a first fluid and a second fluid, comprising:

a substrate configured to act as an electrode, the substrate having a first side and a second side;

a first resilient element configured to act as an electrode and positioned on the first side of the substrate to form a first capacitor with the substrate, the first resilient element comprising a first surface configured to be exposed to the first fluid and a second surface configured to be exposed to the second fluid, wherein a first capacitance of the first capacitor is defined by a first contact area between the first resilient element and the first side, said first contact area varying according to a pressure difference between the first fluid and the second fluid;

a second resilient element configured to act as an electrode and positioned on the second side of the substrate to form a second capacitor with the substrate, the second resilient element comprising a third surface configured to be exposed to the first fluid and a fourth surface configured to be exposed to the second fluid, wherein a second capacitance of the second capacitor is defined by a second contact area between the first resilient element and the second side, said second contact area varying according to the pressure difference;

a first layer of dielectric material disposed between the first resilient element and the substrate;

a first spacing member separate from the first layer of dielectric material and disposed on the first layer of dielectric material, said first resilient element being disposed at an angle with respect to said substrate and over said first spacing member;

a second layer of dielectric material disposed between the second resilient element and the substrate;

a second spacing member separate from the second layer of dielectric material and disposed on the second layer of dielectric material, said second resilient element being disposed at an angle with respect to said substrate and over said second spacing member, wherein portions of both said first resilient element and said first spacing member contact said first layer of dielectric material, and portions of both said second resilient element and said second spacing member contact said second layer of dielectric material.

18. The pressure transducer of claim 17, further comprising:

a first opening through the substrate communicating with the second surface of the first resilient element; and a second opening through the substrate communicating with the third surface of the second resilient element.

19. The pressure transducer of claim 18, wherein said first spacing member is configured to separate a portion of the first resilient element from the first layer of dielectric material and to define a first contact area between the first resilient element and the first layer of dielectric material, the first contact area changing in response to a change in the pressure difference and resulting in a change in capacitance in the first capacitor.

20. The pressure transducer of claim 19, wherein said second spacing member is configured to separate a portion of the second resilient element from the second layer of dielectric material and to define a second contact area between the second resilient element and the second layer of dielectric material, the second contact area changing in response to a change in the pressure difference and resulting in a change in capacitance in the second capacitor.

21. The pressure transducer of claim 18, wherein said first spacing member is configured to separate a portion of the first layer of dielectric material from the substrate and to define a first contact area, the first contact area changing in response to a change in the pressure difference and resulting in a change in capacitance in the first capacitor.

22. The pressure transducer of claim 21, wherein said second spacing member is configured to separate a portion of the second layer of dielectric material from the substrate and to define a second contact area, the second contact area changing in response to a change in the pressure difference and resulting in a change in capacitance in the second capacitor.

* * * * *